(12) United States Patent
Terbu et al.

(10) Patent No.: US 10,315,604 B2
(45) Date of Patent: Jun. 11, 2019

(54) CLAMPING ARRANGEMENT FOR SECURING AN AIRBAG TO AN INFLATOR

(71) Applicant: AUTOLIV ASP, INC., Ogden, UT (US)

(72) Inventors: John Erik Terbu, Clinton, UT (US); Kurt Gammill, Layton, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/611,976

(22) Filed: Jun. 2, 2017

(65) Prior Publication Data

US 2017/0267200 A1 Sep. 21, 2017

Related U.S. Application Data

(63) Continuation-in-part of application No. 14/972,554, filed on Dec. 17, 2015, now Pat. No. 10,196,027.

(51) Int. Cl.
*B60R 21/217* (2011.01)
*B60R 21/201* (2011.01)
*B60R 21/213* (2011.01)
*B60R 21/262* (2011.01)

(52) U.S. Cl.
CPC ........ *B60R 21/201* (2013.01); *B60R 21/2171* (2013.01); *B60R 21/213* (2013.01); *B60R 21/262* (2013.01)

(58) Field of Classification Search
CPC .. B60R 21/2171; B60R 21/201; B60R 21/213
USPC .............................................. 248/74.1–74.3
See application file for complete search history.

(56) References Cited

U.S. PATENT DOCUMENTS

| | | |
|---|---|---|
| 3,454,996 A | 7/1969 | Tetzlaff |
| 6,325,338 B1 | 12/2001 | Del Re et al. |
| 6,783,148 B2 | 8/2004 | Henderson |
| 8,007,000 B2 | 8/2011 | Gammill et al. |
| 8,215,664 B2 * | 7/2012 | Arima ................... B60R 21/26 280/728.2 |

(Continued)

FOREIGN PATENT DOCUMENTS

| | | | |
|---|---|---|---|
| GB | 541613 | 12/1941 | |
| WO | WO-2009043583 A1 * | 4/2009 | ......... B60R 21/2171 |

OTHER PUBLICATIONS

International Search Report and Written Opinion, ISA/US, corresponding to International Application No. PCT/US2016/060512, dated Feb. 2, 2017.

*Primary Examiner* — Ruth Ilan
(74) *Attorney, Agent, or Firm* — Stephen T. Olson; Harness, Dickey & Pierce, P.L.C.

(57) ABSTRACT

A clamping arrangement for an inflatable restraint of a motor vehicle includes a base member and a retention member. The base member has a main body with an axially extending length and a partially cylindrical shape curved in a direction perpendicular to the length. The base member further has at least a first securing portion. Each securing portion includes a planar portion radially extending from the main body of the base member and disposed in a plane parallel to the axially extending length. The retention member has first and second ends connected to the main body of the base member. The first end is connected to the base member by the first securing portion.

18 Claims, 8 Drawing Sheets

(56) References Cited

U.S. PATENT DOCUMENTS

| | | | | |
|---|---|---|---|---|
| 8,505,962 | B2* | 8/2013 | Henriksson | F16L 33/02 |
| | | | | 280/728.2 |
| 8,764,051 | B2* | 7/2014 | Fischer | B60R 21/2171 |
| | | | | 280/728.2 |
| 2001/0026063 | A1* | 10/2001 | Yokota | B60R 21/205 |
| | | | | 280/732 |
| 2003/0005554 | A1* | 1/2003 | Nagayasu | F16L 3/12 |
| | | | | 24/17 AP |
| 2009/0152838 | A1* | 6/2009 | Robins | B60R 21/2171 |
| | | | | 280/728.2 |
| 2012/0205499 | A1* | 8/2012 | Shelton | F16L 3/1091 |
| | | | | 248/62 |
| 2012/0217354 | A1* | 8/2012 | Walraven | F16L 3/1025 |
| | | | | 248/74.1 |
| 2012/0274053 | A1* | 11/2012 | Fischer | B60R 21/213 |
| | | | | 280/728.2 |
| 2016/0288760 | A1* | 10/2016 | Jinnai | B60R 21/23138 |

* cited by examiner

CLAMPING ARRANGEMENT FOR SECURING AN AIRBAG TO AN INFLATOR

CROSS-REFERENCE TO RELATED APPLICATION

This application claims priority to U.S. patent application Ser. No. 14/972,554 filed 17 Dec. 2015, which application is hereby expressly incorporated by reference as if fully set forth herein.

FIELD

The present teachings generally relate to a clamping arrangement. More particularly, the present teachings relate to a clamping arrangement for securing an airbag to an inflator.

BACKGROUND

This section provides background information related to the present disclosure which is not necessarily prior art.

Various passive and active automotive occupant restraint systems are known for enhancing occupant protection in the event of a vehicle impact or vehicle roll-over. Passive systems are deployed with no action required by the occupant and include inflatable restraints or airbags for frontal and side impacts, for example. Airbags are inflated with a pressurized source of gas delivered from an inflator in response to predetermined vehicle conditions.

The high pressure under which an airbag must be inflated requires a secure and reliable connection between the airbag and the inflator. Various clamps have been employed to resist separating forces resulting from the need to inflate an airbag within milliseconds of a sensed vehicle condition, such as a collision or impending collision. Many known clamps must be passed over an end of an inflator. Other known clamps are expensive and/or associated with significant manufacturing waste.

While known clamping arrangements for securing an airbag to an inflator have generally proven to be acceptable for their intended uses, there is a continuous need for improvement in the art.

SUMMARY

This section provides a general summary of the disclosure, and is not a comprehensive disclosure of its full scope or all of its features.

In accordance with one particular aspect, the present teachings provide a clamping arrangement for an inflatable restraint of a motor vehicle including a base member and a retention member. The base member has a main body with an axially extending length and a partially cylindrical shape curved in a direction perpendicular to the length. The base member further has a first securing portion. The first securing portion includes a first planar portion radially extending from the main body of the base member and disposed in a plane parallel to the axially extending length. The retention member has first and second ends connected to the main body of the base member. The first end is connected to the base member by the first securing portion.

In accordance with another particular aspect, the present teachings provide an inflatable restraint of a motor vehicle including an inflator, an airbag, and a clamping arrangement securing the airbag to the inflator. The clamping arrangement surrounds a portion of the inflator and a portion of the airbag and includes a retention member and a base member. The retention member includes first and second ends. The base member has a main body with an axially extending length and a partially cylindrical shape in a direction perpendicular to the length. The partially cylindrical shape extends through no more than 180°. The base member further has first and second securing portions engaging the first and second ends, respectively, the first and second securing portions both radially extend from the main body and axially extend parallel to the length.

In accordance with yet another particular aspect, the present teachings provide a method of securing an airbag to an inflator. The method includes providing a base member having a main body and first and second securing portions radially extending from the main body. The main body has an axially extending length and a partially cylindrical shape in a direction perpendicular to the length. The partially cylindrical shape extending through no more than 180°. The method additionally including inserting a tubular portion of the inflator into a corresponding portion of the airbag and placing the base member adjacent to a first side of the corresponding portion of the airbag after insertion of the tubular portion of the inflator into the corresponding portion of the airbag. Further, the method includes temporarily securing the base member adjacent to the corresponding portion of the airbag with a retention member including first and second ends by positioning the retention member to extend around a second, opposite side of the adjacent portion of the airbag and engaging the first and second ends with the first and second securing portions, the retention member being untensioned. To firmly secure the airbag to the inflator, the retention member is tensioned by moving the first and securing portions toward one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
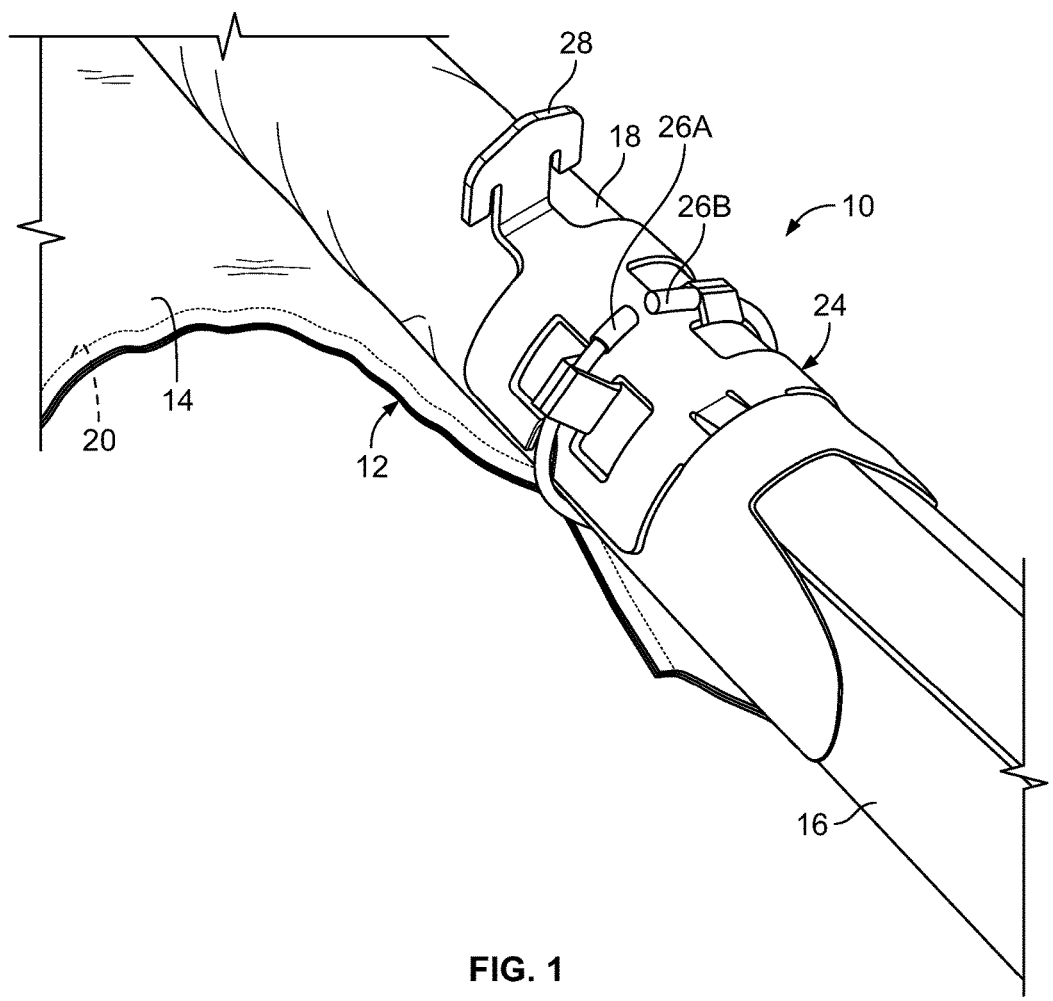
FIG. 1 is a perspective view of a clamping arrangement according to the present teachings, the clamping arrangement incorporated into an inflatable restraint and securing an airbag to an inflator, the securing members of the clamping arrangement shown after crimping.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

With initial reference to FIGS. 1, 1A, 2 and 3 of the drawings, a clamping arrangement in accordance with the present teachings is illustrated and identified at reference character 10. As will become more apparent below, the clamping arrangement 10 may be a combined clamping and mounting arrangement for both clamping an airbag to an inflator and securing the resulting inflatable restraint to a motor vehicle. Various adaptations of the present teachings are shown throughout the drawings.

Figure 1A:
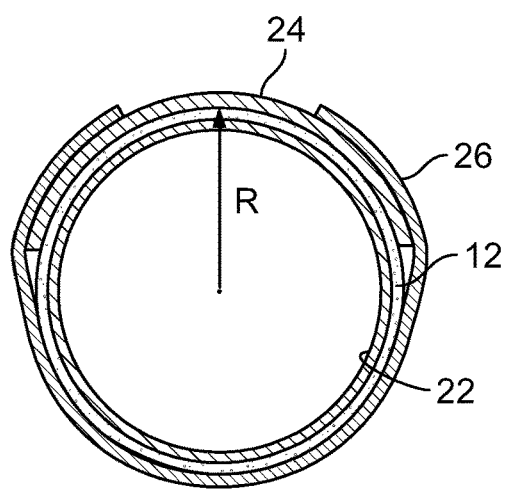
FIG. 1A is a simplified cross-sectional view taken through the clamping arrangement of FIG. 1.

With particular reference to FIGS. 1 and 1A, the clamping arrangement 10 is shown incorporated into an inflatable restraint 12 for securing an airbag 14 to an inflator 16. Insofar as the present teachings are concerned, the airbag 14 and inflator 16 shown in the drawings will be understood to be conventional in construction and operation. The airbag 14 shown may be particularly adapted for use as a side airbag and may include a cylindrical inlet portion 18 in fluid communication with an inflatable cavity 20. A tubular portion 22 of the inflator 16 may be inserted into the cylindrical inlet portion 18 of the airbag 14. It will be understood that the present teachings may be readily adapted for use with various airbags and inflators and that the scope of the present teachings is not limited to the exemplary structures illustrated.

The clamping arrangement 10 of the present teachings is illustrated to generally include a base member or mounting member 24 and a retention member 26. In the embodiment illustrated, the base member 24 may be a mounting bracket and may serve the dual functions of securing the inflator 16 to the airbag 14 and mounting the inflatable restraint 12 to the motor vehicle. The structure of the base member 24 that cooperates with the vehicle to mount the inflatable restraint 12 to the vehicle will be understood to be conventional to the extent not otherwise described herein. In this regard, this cooperating structure of the base member 24 for securing the inflatable restraint 12 to the vehicle may include a T-shaped attachment element 28 integrally formed with the base member 24.

The base member 24 may be unitarily stamped or otherwise formed of steel or other suitable material and may have a partially cylindrical shape defining a radius of curvature R. In this regard, the base member 24 may have a convexly curved inner surface for matingly contacting the inflator 16. As illustrated, the partially cylindrical shape may extend through no more than 180° such that the base member 24 may be positioned adjacent the inflatable restraint without a need to axially pass the base member 24 along the tubular portion 22 of the inflator.

In certain applications, the partially cylindrical shape of the base member 24 may extend through a range of 90° to 180°. In other certain applications, the particularly cylindrical shape may extend through approximately 180°. In the embodiment illustrated, the cylindrical shape may extend through approximately 160°-170°, and particularly through approximately 160°.

The base member 24 has a circumferentially extending dimension perpendicular to an axially extending length. The axially extending length may be greater than the radius of curvature. The axially extending length may be greater than a circumferentially extending dimension of the base member 24.

Certain dimensions of the base member 24 will depend on corresponding dimensions of the inflator 16 such that a compatible interface is provided. In one particular example, the base member 24 may have a radius of curvature R of approximately 22 mm, a circumferential dimension of 60 mm and an axial length of approximately 500 mm. In another particular example, the base member 24 may have a radius of curvature R of approximately 12 mm, a circumferential dimension of 33 mm and an axial length of approximately 100 mm.

The retention member may be a wire or cable hoop 26. The wire or cable hoop 26 may be partially circular in shape and may include first and second ends 26A and 26B. The first and second ends 26A and 26B may carry sleeves (as shown in FIG. 1, for example) The wire or cable hoop 26 and the base member 24 may cooperate to define a generally circular opening for receiving the inflator 16 and the airbag 12. The term "generally circular" will be understood to be broader than perfectly circular. In this regard, generally circular will be understood to be sufficiently circular to secure the airbag 12 to the inflator 16. The wire hoop 26 may be formed of low carbon steel, stainless steel, plastic or other suitable material.

The first and second ends 26A and 26B of the wire or cable hoop 26 may be secured to the base member 24. As illustrated, the first and second ends 26A and 26B of the wire or cable hoop 26 may be secured to an outer surface of the base member 24. In this regard, the base member 24 may include at least one securing member 30A, 30B. As illustrated, the at least one securing member includes first and second pairs of crimp ears 30A and 30B for respectively crimping the first and second ends 26A and 26B of the wire or cable hoop 26. The first and second pairs of crimp ears 30A and 30B may be integrally formed with the base member 24.

Figure 2:
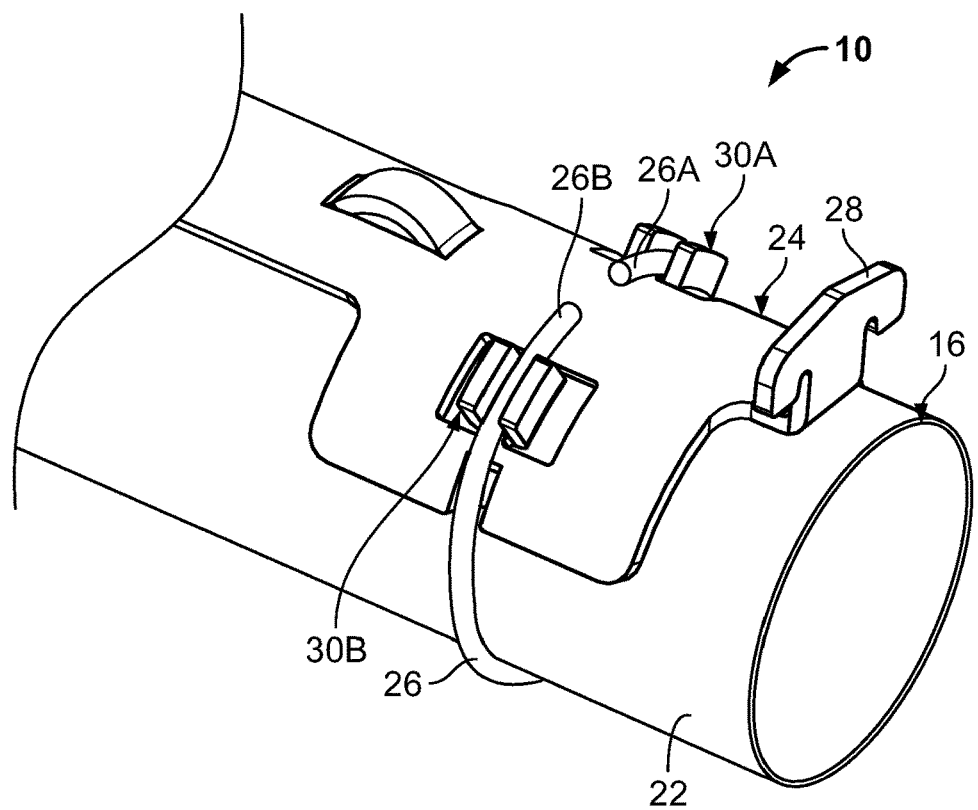
FIG. 2 is a perspective view similar to FIG. 1, illustrated without the airbag and showing the securing members of the clamping arrangement prior to crimping.
Figure 3:
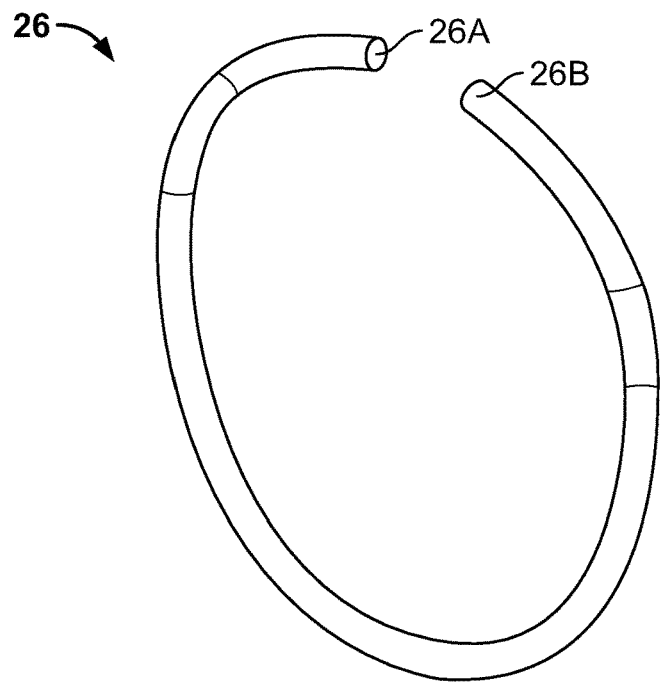
FIG. 3 is a perspective view of a clamp hoop of the clamping arrangement of FIG. 1.

In the embodiment illustrated, the first and second pairs of crimp ears 30A and 30B are stamped are otherwise formed with the base member 24 and bent relative to the base member 24. As shown, the first and second pairs of crimp ears 30A and 30B are rotated through approximately 90 degrees from the remainder of the base member 24. In this orientation first and second pairs of crimp ears 30A and 30B are ready to receive the ends 26A and 26B of the retention member 26, as shown in FIG. 2A, Each pair of crimp ears 30A and 30B includes a crimp ear positioned on axially opposite sides (with reference to the axial length of the base member 24) of a corresponding end 26A and 26B retention member 26. From the orientation shown in FIG. 2, the first and second pairs of crimp ears 30A and 30B can now be crimped to secure the retention member 26 to the base member 24, as shown in FIG. 1.

Figure 4:
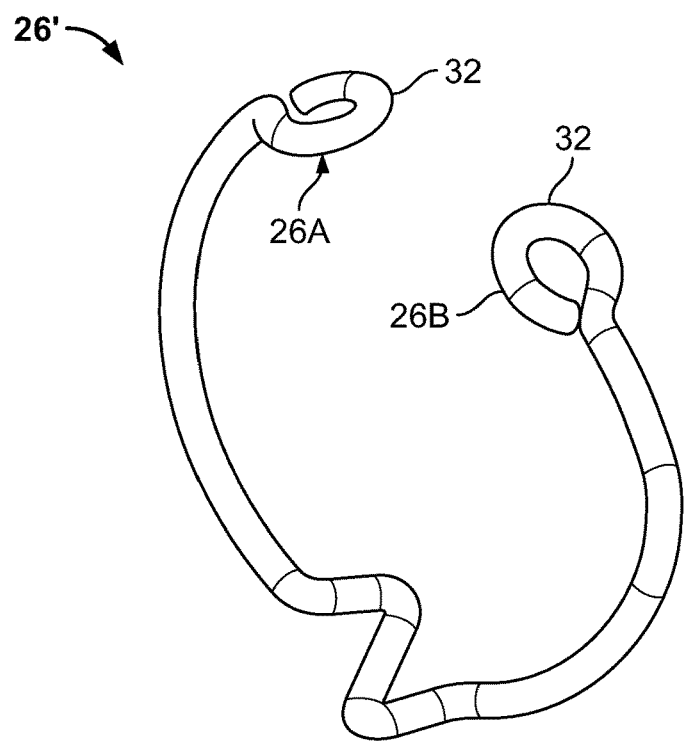
FIG. 4 is a perspective view of an alternative clamp hoop in accordance with the present teachings.

Turning to FIG. 4, an alternative retention member 26 is illustrated. To the extent not otherwise described, the retention member 26' will be understood to be similar to retention member 26. Thus, similar reference characters will be used to identify similar elements. The retention member 26' may be formed such that the first and second ends 26A and 26B include loops 32. The retention member 26' may also be formed as a tension spring to accommodate airbag cushion compression over time.

Figure 5:
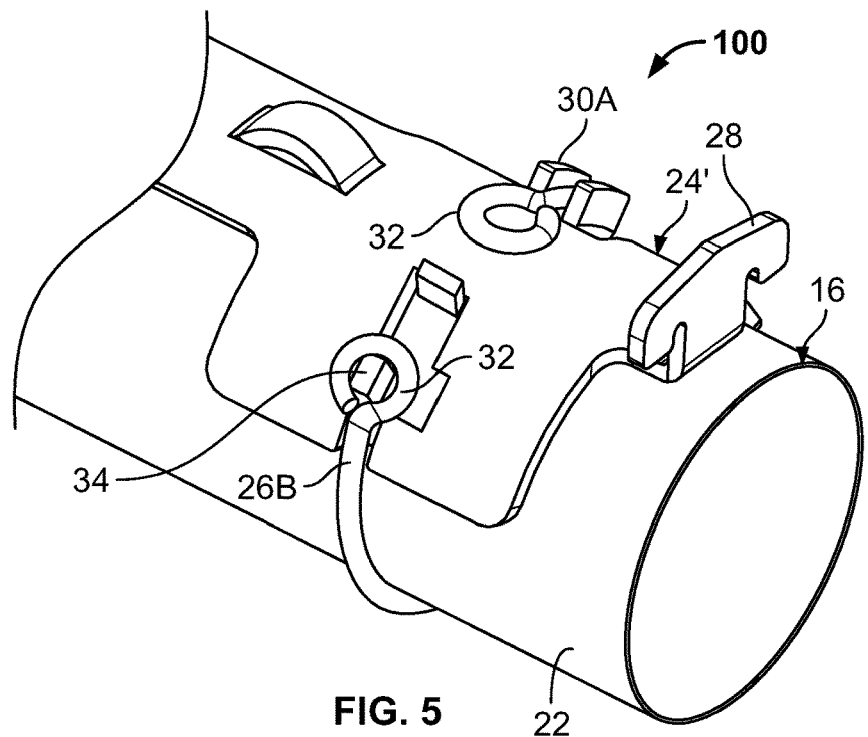
FIG. 5 is a perspective view similar to FIG. 2, illustrating a clamping arrangement that includes the alternative clamp hoop of FIG. 4 and an alternative base member.

With reference to FIG. 5, another clamping arrangement in accordance with the present teachings is illustrated and identified at reference character 100. To the extent not otherwise described, arrangement 100 will be understood to be similar to arrangement 10. Thus, similar reference characters will be used to identify similar elements.

The clamping arrangement 100 of FIG. 5 incorporates the wire or cable hoop 26' of FIG. 4. The arrangement 100 includes a base element 24' with a single pair of clamp ears 30A. FIG. 4 shows the clamp ears 30A prior to crimping. Upon crimping, the clamp ears 30A clamp the first end 26A of the wire hoop 26'. The base element 24' is shown to further include an integrally formed projection 34 radially extending from the base member 24. The projection 34 is received within an opening defined by the loop 32 at the second end 26B.

Figure 6:
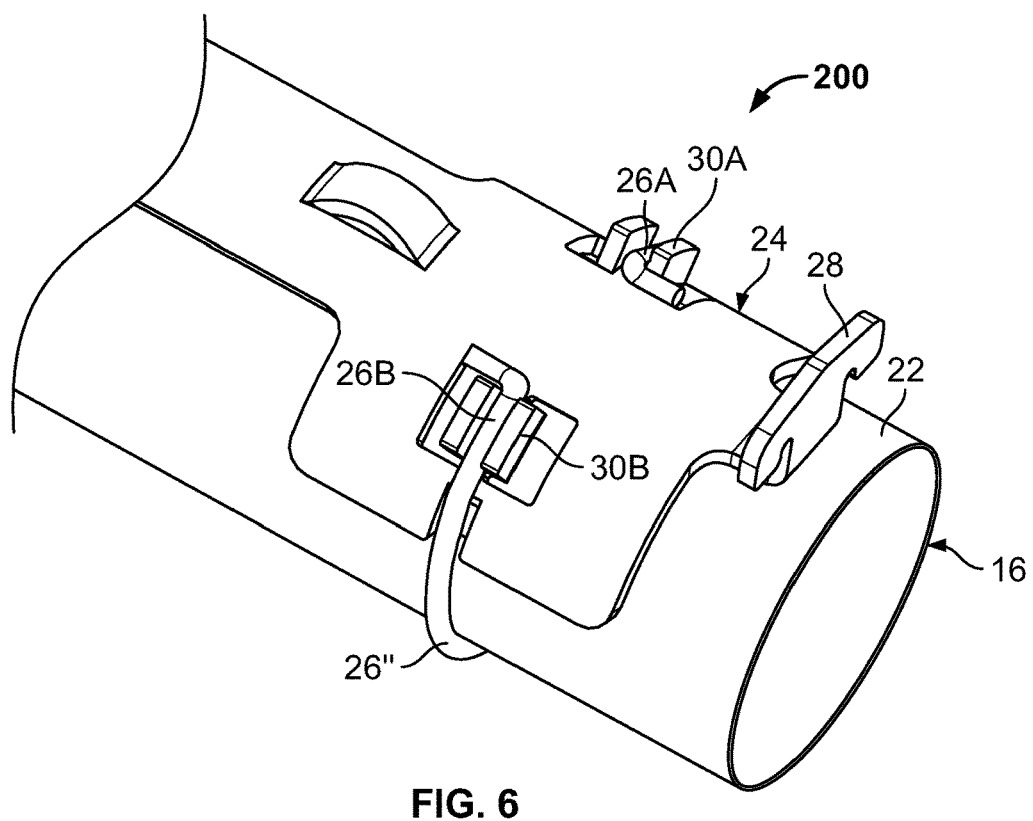
FIG. 6 is another perspective view similar to FIG. 2, the clamping arrangement illustrated to include another alternative clamp hoop.

With reference to FIG. 6, another clamping arrangement in accordance with the present teachings is illustrated and identified at reference character 200. To the extent not otherwise described, arrangement 200 will be understood to be similar to arrangement 10. Thus, similar reference characters will be used to identify similar elements.

The arrangement 200 is shown to incorporate an alternative clamp loop 26". In this embodiment, the first and second ends 26A and 26B of the clamp hoop 26" may be L-shaped. As with the arrangement 10, the first and second ends 26A and 26B of the clamp hoop 26" may be clamped by the first and second pairs of clamp ears 30A and 30B, respectively. The L-shaped ends 26A and 26B may provide further resistance against the ends 26A and 26B separating from the base member 24.

With reference to FIGS. 7A through 7E, another clamping arrangement in accordance with the present teachings is illustrated and identified at reference character 300. As with the prior embodiments, the clamping arrangement 300 is operative for securing a cylindrical inlet portion 18 of an airbag 12 to a tubular portion 22 of an inflator 16. The clamping arrangement 300 is illustrated to generally include a base member or mounting member 302 and a first retention member 304A. In the embodiment illustrated, the clamping arrangement 300 further includes a second mounting member 304B.

The base member 302 has an axially extending length and a partially cylindrical shape curved in a direction perpendicular to the length. The partially cylindrical shape of the base member 302 may extend through no more than 180°. This configuration allows the base member 302 to be laterally placed adjacent the tubular portion 18 of the inflator 16 and the airbag 12 and thereby avoid any need of sliding the clamping arrangement along the length of the tubular portion 22. In certain applications, the base member 302 extends through at least 90°.

The retention member 304A will again be understood to be a wire or cable hoop 304A. To the extent not otherwise described below, the retention member 304B and its connection to a main body 306 of the base member 302 will be understood to be identical to the retention member 304 and its connection to the main body 306. The retention member 304A includes a first end 308 and a second end 310. The first and second ends 308 and 310 may include sleeves 312 secured to the retention member 304A (commonly referred to herein with reference character 304). In the embodiment illustrated, the sleeves include a proximal tubular portion 312A and an enlarged distal portion 312B. The distal portion 312B may be spherical or at least partially spherical.

The main body 306 of the base portion 302 is connected to the first and second ends 308 and 310 of the retention member 304A. At least one of the ends 308 or 310 is connected to the main body 306 through a securing portion 314 having a planar portion 316. As illustrated, the first and second ends 308 and 310 are connected through first and second securing portions 314A and 314B. Alternatively, it will be understood that one of the ends 308 or 310 may be connected to the main body 306 without a securing portion having a planar portion. In this regard, various examples of such alternative attachment are shown and described above. In the same regard, the retention member 304A may be modified to include an end having a loop, L-shape or other structure for attachment to the main body 306.

Figure 7A:
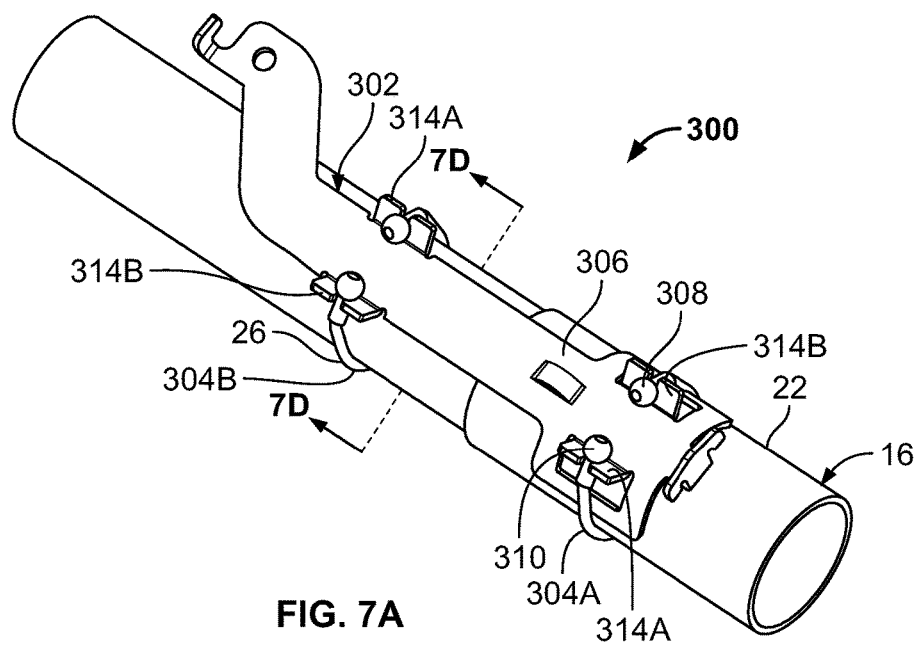
FIG. 7A is a perspective view of another clamping arrangement according to the present teachings, the clamping arrangement shown securing an airbag to an inflator.
Figure 7B:
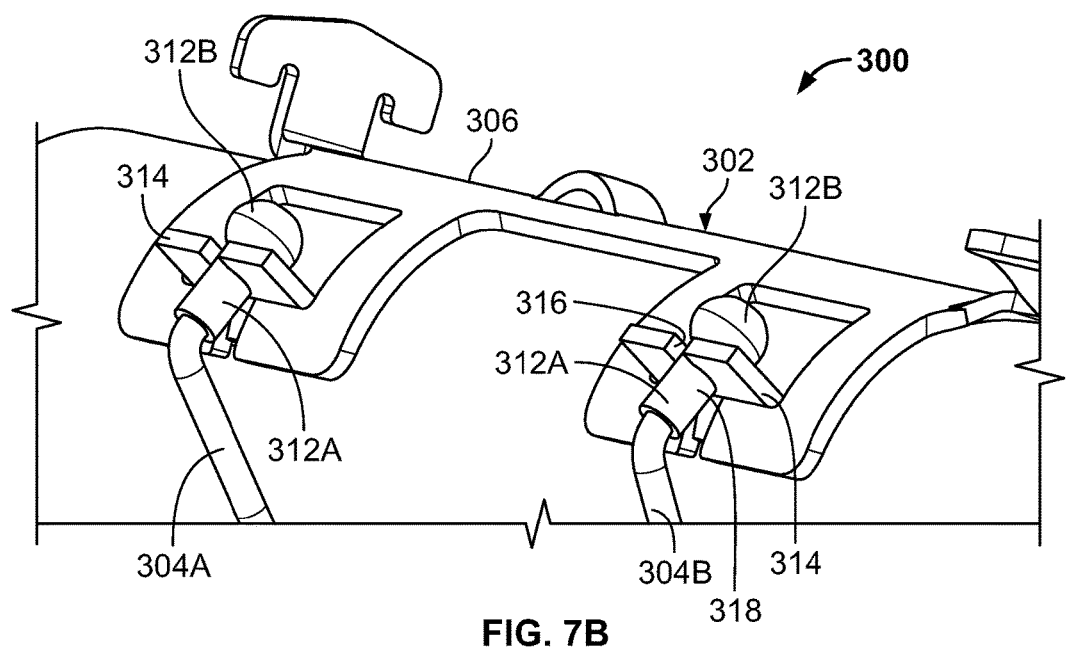
FIG. 7B is an enlarged perspective view of a portion of the clamping arrangement of FIG. 7A.
Figure 7C:
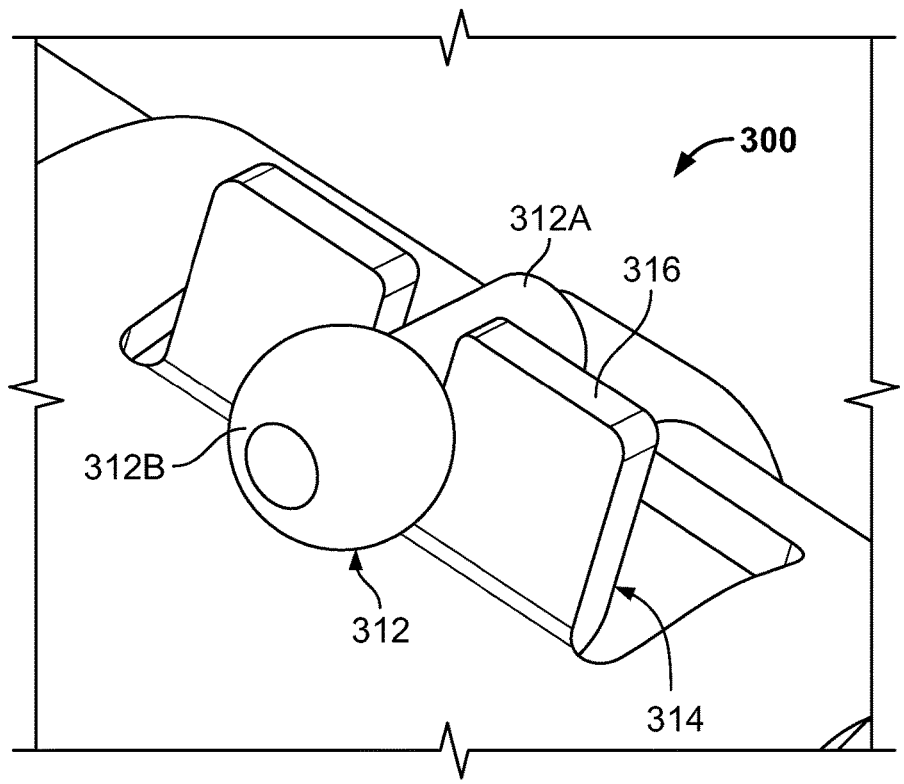
FIG. 7C is another enlarged perspective view of a portion of the clamping arrangement of FIG. 7A.
Figure 7D:
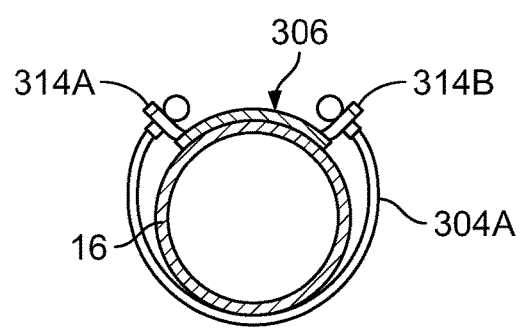
FIG. 7D is a simplified cross-sectional view taken along the line 7D-7D of FIG. 7A, the securing members shown in a final position with the retaining member in a tensioned state.
Figure 7E:
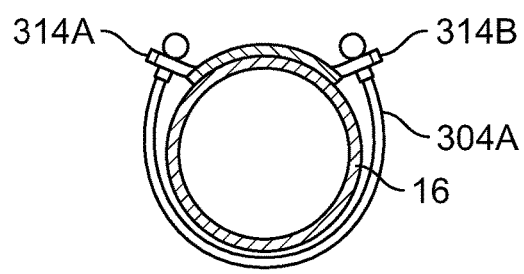
FIG. 7E is a simplified cross-sectional view similar to FIG. 7D, the securing members shown in an initial position with the retaining member in an untensioned state.

As perhaps best shown in the simplified sectional view of FIG. 7D, the retention member 304A and the base member 302 may cooperate to define a generally circular opening. Again, as used herein the term "generally circular" will be understood to mean that the cooperatively defined opening is sized and configured for clamping of the airbag 14 to the tubular portion 22 of the inflator 16.

The securing portions 314 may be integrally formed with the base member 302. For example, the base member 302 may be stamped or otherwise suitably formed to include the securing portions 314. The securing portions 314 may be bent relative to the main body 306 so as to radially extend from the main body 306. As will be discussed below, the securing portions 314 may be crimped or otherwise articulated from an initial position (shown in FIG. 7E) to a final position (shown in FIG. 7D) to tension the retaining member 304A.

As perhaps best shown in FIG. 7B, the securing portions 314 may include a slot 316 open at the top of the planar portion 316 which extends to a circular opening 318. The circular opening has a diameter greater than a width of the slot. The tubular portion 312A of sleeves 312 may have a diameter slightly smaller than the diameter of the circular opening but greater than the width of the slot. In this manner, the end of the retaining member 304A cannot move radially. The enlarged distal portion 312B of the sleeves 312 may have a diameter greater than the circular opening to prevent the sleeve from pulling out of the securing portion 314 in a circumferential direction.

The foregoing description of the securing portions 314 is directed to those securing portions 314 associated with the first retaining member 304A. To the extent not otherwise described, it will be understood that the securing portions 314 associated with the second retaining member 304B are similarly constructed. Different therefrom, the securing portions 314 associated with the second retaining member 304B extend from a perimeter of the main body 306 prior to being bent.

Figure 8A:
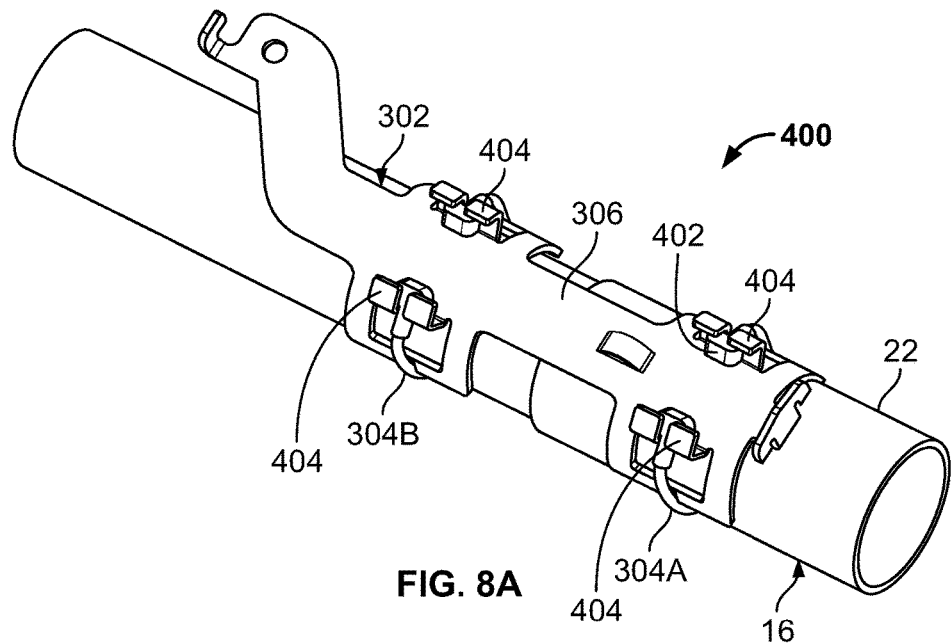
FIG. 8A is a perspective view of another clamping arrangement according to the present teachings, the clamping arrangement again shown incorporated into an inflatable restraint and securing an airbag to an inflator.
Figure 8B:
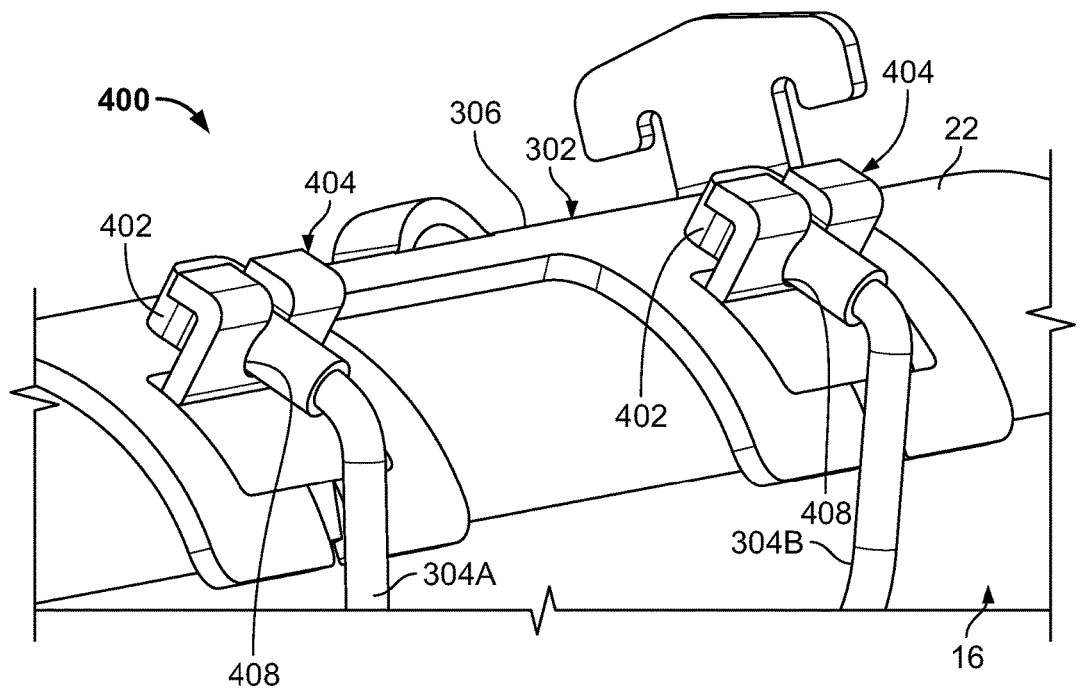
FIG. 8B is an enlarged perspective view of a portion of the clamping arrangement of FIG. 8A.
Figure 8C:
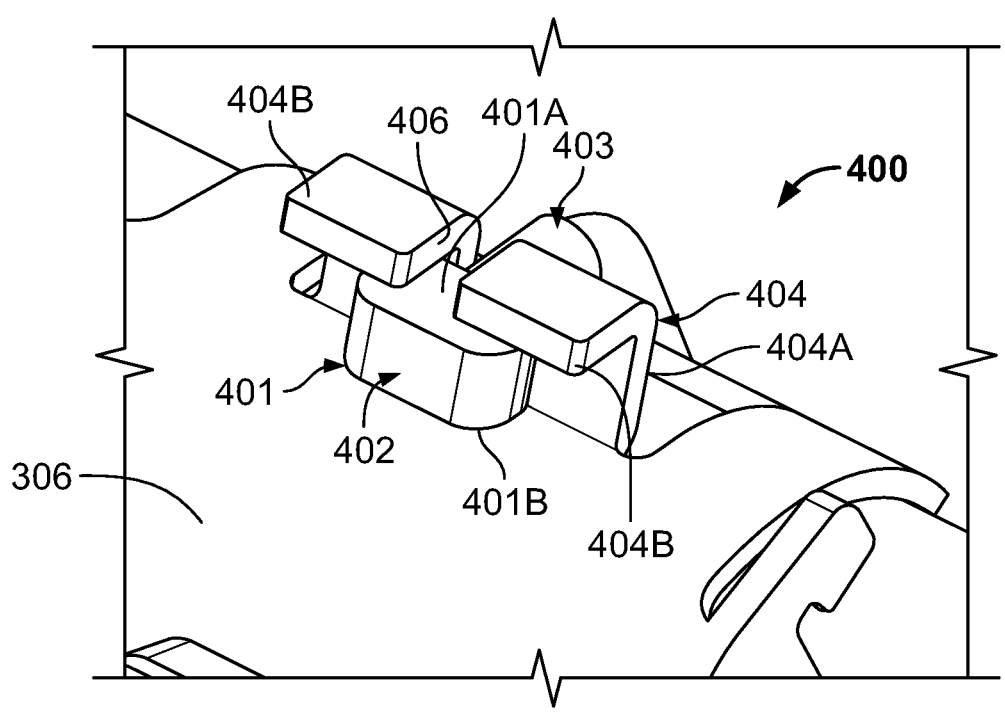
FIG. 8C is another enlarged perspective view of a portion of the clamping arrangement of FIG. 8A.

With reference to FIGS. 8A through 8C, another clamping arrangement in accordance with the present teachings is illustrated and identified at reference character 400. Given the similarities between the clamping arrangement 300 and the clamping arrangement 400, like reference characters will be used to identify the elements. The clamping arrangement 400 differs from the clamping arrangement 300 in the configurations of the securing portions 314 and the configuration of the sleeves 312. Otherwise, it will be understood that these embodiments are substantially identical.

The first and second retention members 304A and 304B include ends carrying sleeves 402 having an enlarged end 401 and a proximal tubular portion 403. The enlarged end 401 includes a flat upper surface 401A and a flat lower surface 401B.

The base member 306 includes securing portions 404 which compare to securing portions 314 of arrangement 300. The securing portions 404 similarly include a planar portion 404A radially extending from the base member 306 in a similar manner to the securing portions 314 for the arrangement 300. In addition to the planar portion 404A, each securing portion 404 includes a flange 404B generally perpendicular to the associated planar portion 404A. Each securing portion 404 includes a slot 406 pass through the planar portion 404A and the flange 404B. The slot 406 downwardly extends to a circular opening 408 in the planar portion 404A. The enlarged ends 401 have an axially extending length greater than a width of the slot 406. The proximal tubular portion 403 of each sleeve 402 has a diameter smaller than the circular opening 408 but greater than a width of the slot 406.

The method of securing an airbag 14 to an inflator 22 of the present teachings will be described with reference to the arrangement of FIGS. 7A-7E. It will be understood that the arrangement of FIGS. 8A-8C may be similarly used to secure the airbag 12 to the tubular portion 22 of the inflator 16. After the tubular portion of the inflator 22 is inserted into the corresponding cylindrical inlet portion 18 of the airbag 14, the base member 302 is laterally positioned adjacent the tubular portion 22 of the inflator 16 with the airbag 12 positioned therebetween. As such, the base member 302 adjacent to a first side of the corresponding portion of the airbag 14. At this point, the securing portions 314 are in initial positions (see FIG. 7E). Explaining further, the securing portions 314 are oriented in initial planes. The initial planes are parallel to the length of the base member 302. The base member 302 is temporarily securing the base member adjacent to the corresponding portion of the airbag 14 such that the retention member 304A extends around a second, opposite side of the adjacent portion 18 of the airbag 14. The retaining member 304A is engaged with the securing portions 314 in the manner discussed above and the retaining member 304A is not yet in tension. Rather, the securing portions 314 serve to temporarily retain the retaining member 304A and temporarily secure the base member 302 adjacent to the portion 18 of the airbag 14. The securing portions 314 are now moved toward one another to tension the retaining member 304A. In this regard, the securing portions may be crimped or otherwise articulated from the initial position to a final position (see FIG. 7D). In the embodiment illustrated, the first securing portion 314A is moved toward the second securing portion 314B and the second securing portion 314B is moved toward the first securing portion 314A. In certain applications, however, it may be sufficient to move only one of the first and second securing portions 314A and 314B.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clamping arrangement for an inflatable restraint of a motor vehicle, the clamping arrangement comprising:
   a base member having a main body with an axially extending length and a partially cylindrical shape curved in a direction perpendicular to the length, the base member further having a first securing portion with a first planar portion radially extending from the main body of the base member; and
   a retention member having first and second ends connected to the main body of the base member, the first end connected to the base member by the first securing portion,
   wherein the first securing portion is displaceable from an initial position to a final position to tension the retention member.

2. The clamping arrangement for an inflatable restraint of a motor vehicle of claim 1, wherein the base member further has a second securing portion with a second planar portion radially extending from the main body of the base member, the second end connected to the base member by the second securing portion.

3. The clamping arrangement for securing an inflatable restraint of a motor vehicle of claim 1, wherein the partially cylindrical shape of the main body of the base member extends through an approximate range of 90° to 180°.

4. The clamping arrangement for securing an inflatable restraint of a motor vehicle of claim 1, wherein the partially cylindrical shape of the main body of the base member extends through no more than 180°.

5. The clamping arrangement for securing an inflatable restraint of a motor vehicle of claim 1, wherein the retention member is selected from a group consisting of a wire or cable hoop.

6. The clamping arrangement for securing an inflatable restraint of a motor vehicle of claim 1, wherein the retention member and the base member cooperate to define a generally circular opening.

7. The clamping arrangement for securing an inflatable restraint of a motor vehicle of claim 1, wherein the first securing portion is integrally formed with the main body of the base member.

8. An inflatable restraint of a motor vehicle, the inflatable restraint comprising:
an inflator;
an airbag; and
a clamping arrangement securing the airbag to the inflator, the clamping arrangement surrounding a portion of the inflator and a portion of the airbag, the clamping arrangement including a retention member and a base member, the retention member includes first and second ends, the base member has a main body with an axially extending length and a partially cylindrical shape in a direction perpendicular to the length, the partially cylindrical shape extending through no more than 180°, the base member further having first and second securing portions engaging the first and second ends, respectively, the first and second securing portions both radially extending from the main body.

9. The inflatable restraint of claim 8, wherein the first securing portion includes a first planar portion and the second securing portion includes a second planar portion.

10. The inflatable restraint of claim 8, wherein the retention member and the base member cooperate to define a generally circular opening.

11. The inflatable restraint of claim 8, wherein the retention member is a wire or cable hoop.

12. The inflatable restraint of claim 8, wherein the partially cylindrical shape of the main body of the base member extends through at least 90°.

13. The inflatable restraint of claim 8, wherein the first and second securing portions are integrally formed with the main body of the base member.

14. The inflatable restraint of claim 8, wherein the first and second securing portions are displaceable toward one another to tension the retention member.

15. A method of securing an airbag to an inflator, the method comprising:
providing a base member having a main body and first and second securing portions radially extending from the main body, the main body having an axially extending length and a partially cylindrical shape in a direction perpendicular to the length, the partially cylindrical shape extending through no more than 180°;
inserting a tubular portion of the inflator into a corresponding portion of the airbag;
placing the base member adjacent to a first side of the corresponding portion of the airbag after insertion of the tubular portion of the inflator into the corresponding portion of the airbag;
temporarily securing the base member adjacent to the corresponding portion of the airbag with a retention member including first and second ends by positioning the retention member to extend around a second, opposite side of the adjacent portion of the airbag and engaging the first and second ends with the first and second securing portions, the retention member being untensioned; and
tensioning the retention member to firmly secure the airbag to the inflator by moving at least one of first and second securing portions toward the other of the first and second securing portions.

16. The method of claim 15, wherein tensioning the retention member to firmly secure the airbag to the inflator includes moving the first securing portion toward the second securing portion and moving the second securing portion toward the first securing portion.

17. The method of claim 16, wherein the first and second securing portions are moved toward one another by crimping.

18. An inflatable restraint comprising:
an airbag;
an inflator having a tubular portion; and
a clamping arrangement including:
a base member having a main body with an axially extending length and a partially cylindrical shape curved in a direction perpendicular to the length, the base member further having a first securing portion with a first planar portion radially extending from the main body of the base member; and
a retention member having first and second ends connected to the main body of the base member, the first end connected to the base member by the first securing portion,
wherein the base member and the retention cooperate to circumferentially surround a portion of the airbag and the tubular portion of the inflator for securing the airbag to the inflator.

* * * * *